United States Patent [19]
Derrick et al.

[11] Patent Number: 5,906,659
[45] Date of Patent: May 25, 1999

[54] COMPUTER SYSTEM BUFFERS FOR PROVIDING CONCURRENCY BETWEEN CPU ACCESSES, LOCAL BUS ACCESSES, AND MEMORY ACCESSES

[75] Inventors: John Edward Derrick, Milton; William R. Greer, Waterville, both of Vt.; Christopher Michael Herring, Longmont, Colo.

[73] Assignee: International Business Machines Corporation, Armonk, N.Y.

[21] Appl. No.: 08/911,174

[22] Filed: Aug. 14, 1997

Related U.S. Application Data

[62] Division of application No. 08/485,415, Jun. 7, 1995.
[51] Int. Cl.[6] .................................................. G06F 13/00
[52] U.S. Cl. .............................. 710/52; 711/143; 710/53; 710/54; 710/55; 710/56; 710/57; 710/113; 710/128; 710/129
[58] Field of Search .............................. 711/143; 710/53, 710/54, 55, 56, 57, 113, 128, 129

[56] References Cited

U.S. PATENT DOCUMENTS

| | | | |
|---|---|---|---|
| 5,448,701 | 9/1995 | Metz, Jr. et al. | 710/113 |
| 5,625,779 | 4/1997 | Solomon et al. | 710/113 |
| 5,664,150 | 9/1997 | Isaac et al. | 711/143 |
| 5,740,468 | 4/1998 | Hirose | 710/57 |
| 5,745,732 | 4/1998 | Cheruki et al. | 395/495 |

*Primary Examiner*—Ayaz R. Sheikh
*Assistant Examiner*—Frantz B. Jean
*Attorney, Agent, or Firm*—Schmeiser, Olsen & Watts; Howard J. Walter, Jr.

[57] ABSTRACT

Buffers are provided in a computer system to allow posting data to the buffers, followed by concurrent operation by different portions of the computer system. A CPU buffer is provided to buffer CPU accesses, a CPU-to-PCI buffer is provided to buffer CPU accesses to the PCI local bus, and a memory buffer is provided to buffer CPU accesses to main memory. This configuration allows the CPU-to-PCI buffer to write data concurrently with the memory buffer accessing data from main memory.

11 Claims, 2 Drawing Sheets

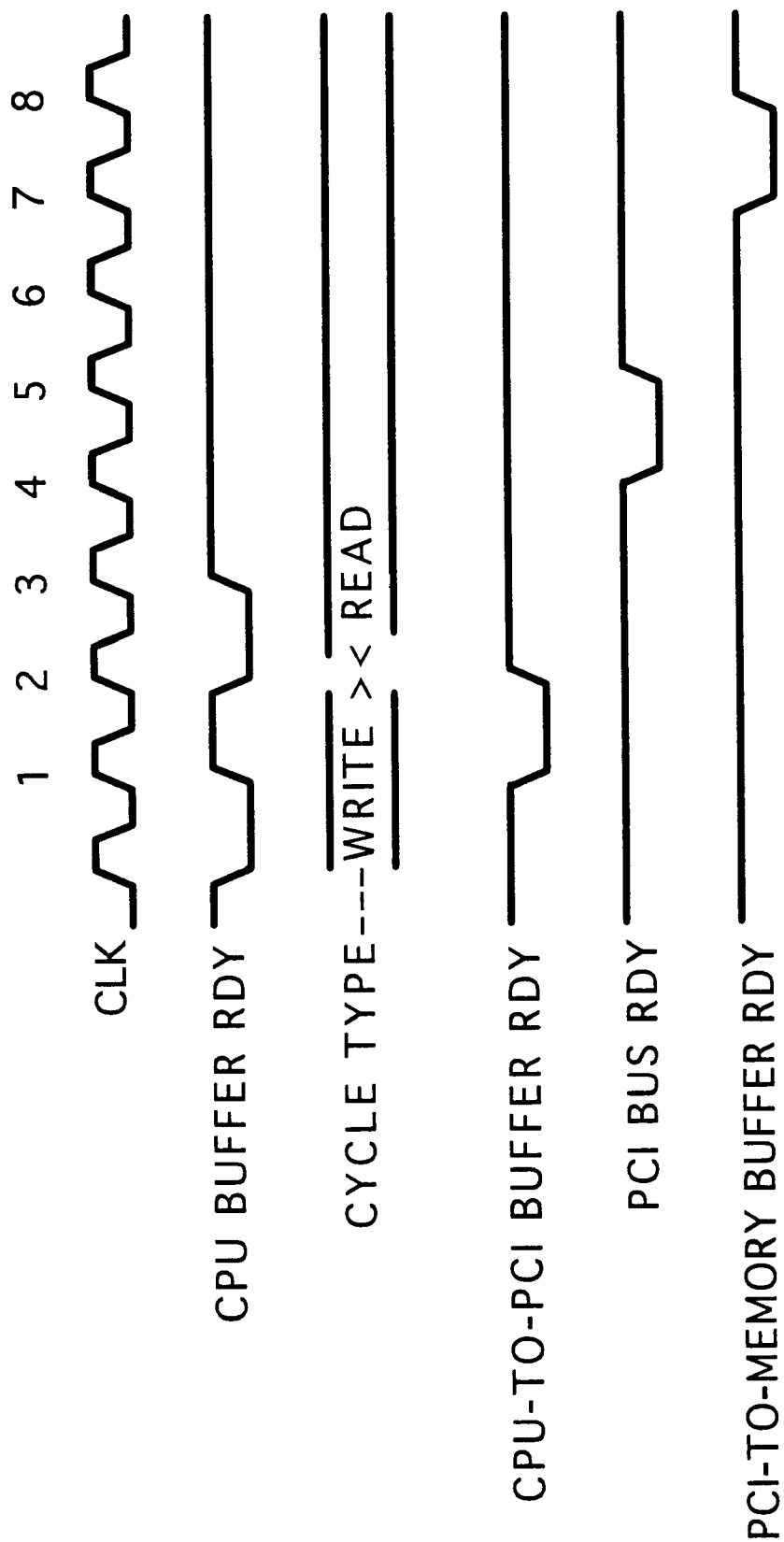

COMPUTER SYSTEM BUFFERS FOR PROVIDING CONCURRENCY BETWEEN CPU ACCESSES, LOCAL BUS ACCESSES, AND MEMORY ACCESSES

This application is a division of application Ser. No. 08/485,415 filed Jun. 7, 1995 which application is now pending.

BACKGROUND OF THE INVENTION

1. Technical Field

This invention generally relates to computer systems, and, more specifically, to a buffering scheme used in a computer system for improving system performance by providing concurrent operation of CPU cycles, cycles to memory, and cycles to a local bus under specific circumstances.

2. Background Art

A modern microcomputer system typically comprises a CPU coupled to a local bus, and coupled to a main memory via a memory bus. The local bus is typically connected to an expansion bus, such as a typical ISA, EISA, or Micro-channel® bus. One example of a local bus is the Peripheral Component Interconnect (PCI) bus commonly used in microcomputers based on the Intel Pentium ® CPU. One of the most efficient ways to improve performance in a computer system is to use posted data buffers. For example, a host bridge interposed between the CPU and the PCI bus may include posted data buffers to store several CPU-to-PCI write operations, thereby freeing up the CPU to continue processing while the host bridge becomes a PCI bus master by arbitrating for and obtaining ownership of the PCI bus, and then passes the data to the appropriate PCI device. Posted data buffers may also be used when the host bridge is acting as a slave device on the PCI bus, such as when another PCI device wants to write data to main memory. The posted data buffers within the host bridge can store data for multiple PCI writes to main memory (usually to consecutive locations), thereby freeing up the PCI bus for other PCI devices to use.

One example of a posted data buffer is disclosed in U.S. Pat. No. 5,224,214 "Buffers for Gathering Write Requests and Resolving Read Conflicts by Matching Read and Write Requests" (issued Jan. 29, 1993 to Rosich and assigned to Digital Equipment Corp.), which is incorporated herein by reference. Other types of data buffers are known, as shown in U.K. Pat. No. GB 2 248 128 A "A Single Board Computer" (issued Mar. 25, 1992 to Coates et al. and assigned to Online Computing Limited); and U.S. Pat. No. 5,239,636 "Buffer Memory Subsystem for Peripheral Controllers" (issued Aug. 24, 1993 to Dujari et al. and assigned to Advanced Micro Devices, Inc.), which are incorporated herein by reference.

Two problems associated with posted data buffers are data coherency and possible deadlock conditions. Maintaining data coherency is essential to assure that data in main memory is updated with the contents of any posted data buffers containing the data prior to another device accessing the data. For example, when a host bridge is acting as a slave on the PCI bus, it may receive write data from a PCI master and store the data in its posted data buffers, followed by the PCI master releasing the PCI bus. At that point, the PCI master will signal the CPU via interrupt that the transfer has taken place, and the CPU will then retrieve the data from main memory. To maintain data coherency, the data in the posted data buffers must be transferred to main memory before the CPU is allowed to read the data. Otherwise, erroneous data will be returned to the CPU.

Another problem with posted buffers is the possibility of deadlock. Potential deadlock conditions exist when a first PCI device holds data to be written to a second PCI device in its posted data buffers, and the second PCI device also wants to send data to the first PCI device. If both devices cannot receive new data until they have transmitted their write data, then a deadlock occurs. Two devices that may become deadlocked are interlocked devices. For example, an expansion bus bridge coupled to the PCI bus and to a typical expansion bus (such as ISA, EISA, Micro-channel®, etc.) may become interlocked with other PCI devices. Once the expansion bus bridge wins arbitration of the PCI bus for an expansion bus device, it cannot relinquish the PCI bus if the intended PCI target cannot accept the data. If the PCI target device has posted data to send to the expansion bus that it must transmit before it can accept new data, a deadlock condition exists. If either of the expansion bus bridge and the PCI target device could receive data while waiting to transmit write data, the deadlock would not exist.

One possible solution to avoid the deadlock of interlocked devices is to use side band signals (i.e., signals that are not part of the PCI bus protocol) to force a flush of all posted write data buffers in interlocked PCI devices to memory, and to acknowledge that this flush has been completed. The two needed signals are FLUSH and ACKNOWLEDGE. The PCI bus arbiter would signal FLUSH before it granted the bus to the expansion bus bridge so that each interlocked device that has write data in its posted data buffers can arbitrate and transmit all the data in its buffers. Once the interlocked devices have emptied and disabled their buffers, ACKNOWLEDGE signals the expansion bus bridge to grant the expansion bus to the requesting device and gain ownership of the PCI bus for it. Then the transfer can take place with assurance that all interlocked devices can accept new data. This solution requires the use of at least two pins for the side band signals, potentially increasing the cost of the devices that need the side band signals since higher pin counts usually require larger, more expensive packages. In addition, since these side band signals are outside of the PCI specification, care must be taken to ensure that any interlocked devices support the same protocol or risk potential deadlocks within the computer system, adding complexity to the system.

The disadvantages of the side band signal solution to the data coherency and deadlock problems that arise when using posted data buffers result in the need for a solution that uses no side band signals (i.e., conforms to PCI bus specifications), and that maximizes concurrency in the computer system while assuring data coherency and avoiding deadlock conditions.

DISCLOSURE OF INVENTION

According to the present invention, several posted data buffers cooperate to provide a computing system with improved system performance by maximizing concurrent operations. A CPU buffer stores CPU accesses; a memory buffer stores accesses to main memory; a CPU-to-PCI buffer stores accesses from the CPU to the PCI local bus; and a PCI-to-memory buffer stores accesses from the PCI bus to main memory. The operation of these buffers is controlled by control circuitry that assures data coherency and prevents deadlock.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 2 is a timing diagram showing one example of time savings from concurrent operation of the computer system of FIG. 1.

BEST MODE FOR CARRYING OUT THE INVENTION

Figure 1:
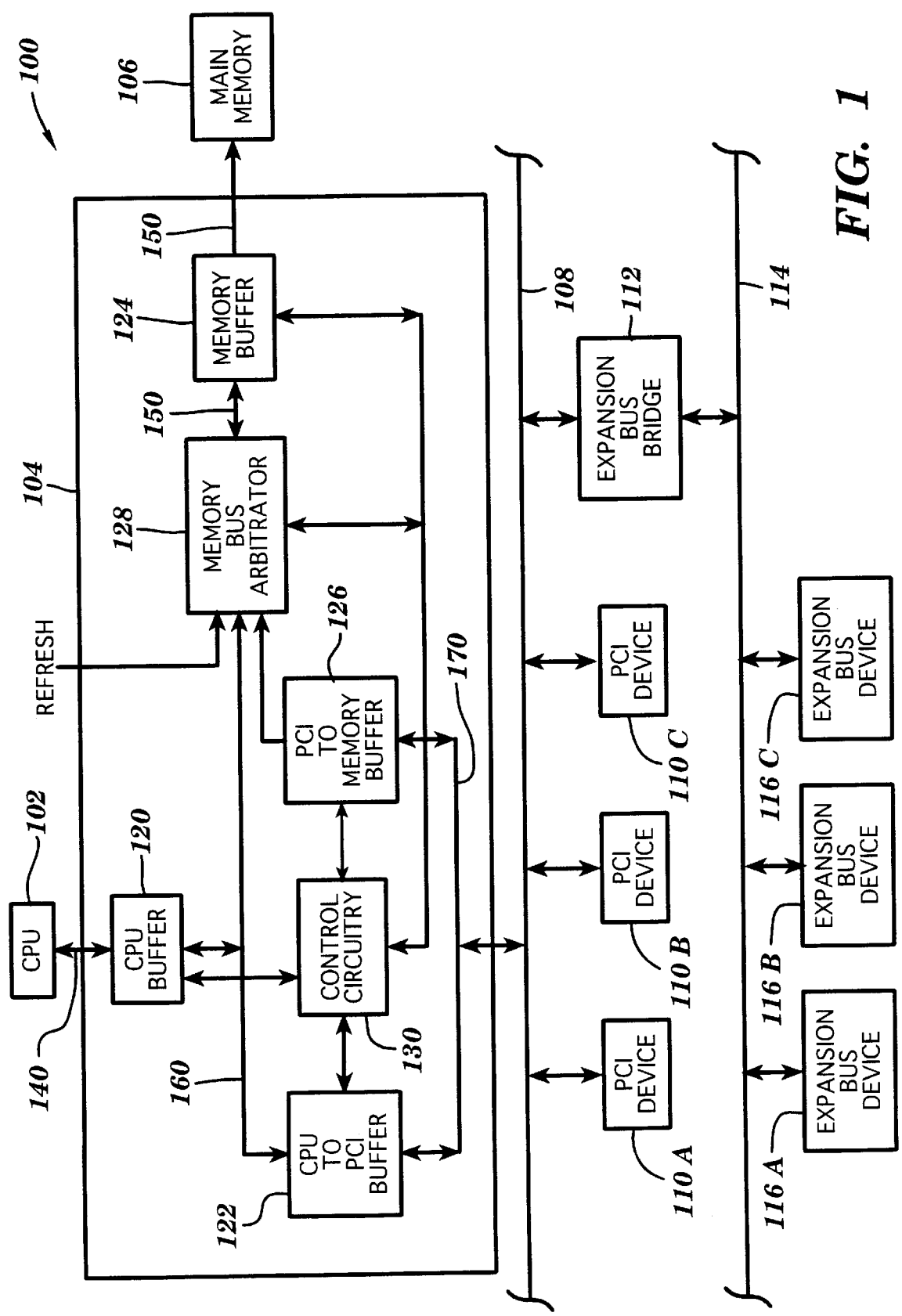
FIG. 1 is a block diagram of a computer system with buffers in accordance with the present invention.

Referring to FIG. 1, a computer system 100 in accordance with the present invention includes a CPU 102, a host bridge 104, a main memory 106, a PCI bus 108, one or more PCI devices 110A–C, an expansion bus bridge 112, an expansion bus 114, and one or more expansion bus devices 116A–C. Host bridge 104 is interposed between CPU 102, main memory 106, and PCI bus 108, and controls all data exchanges among these three. Host bridge 104 nominally includes several buffers that function as posted data buffers. Host bridge 104 also includes control circuitry (i.e., control circuitry 130 and memory bus arbiter 128) for controlling the function of the buffers, which among other things, assures data coherency, avoids deadlock conditions, and provides for concurrent operations where possible.

CPU 102 performs the central processing of computer system 100, and is a suitable processor, such as a Pentium® microprocessor manufactured by Intel. CPU 102 is coupled to host bridge 104 via a CPU bus 140. All interactions by CPU 102 with main memory 106 or PCI bus 108 occur across CPU bus 140 and through host bridge 104.

Main memory 106 serves as the primary storage space for CPU 102, and is a suitable storage medium, such as Dynamic Random Access Memory (DRAM). Main memory 106 is coupled to host bridge 104 via a memory bus 150. All communications to main memory 106 occur through host bridge 104 across memory bus 150.

PCI bus 108 interconnects host bridge 104, PCI devices 110A–C, and expansion bus bridge 112. PCI bus 108 represents any suitable local bus for interacting with the devices coupled to it, and typically has a bandwidth that is greater than the bandwidth of expansion bus 114. PCI devices 110A–C are Input/Output (I/O) devices that typically require relatively high data rates, such as video adapters and hard disk controllers.

Expansion bus 114 interconnects expansion bus bridge 112 and expansion bus devices 116A–C, and may be any suitable type of expansion bus, including ISA, EISA, and Micro-channel®. Expansion bus devices 116A–C are I/O devices that require relatively low data rates, such as modems and printer ports.

Referring again to FIG. 1, host bridge 104 suitably includes buffers for enhancing the performance of computer system 100 by maximizing concurrent operation. For example, host bridge 104 suitably includes: a CPU buffer 120; and CPU-to-PCI buffer 122; a memory buffer 124; a PCI-to-memory buffer 126; a memory bus arbiter 128; suitable control circuitry 130 for controlling the operation of buffers 120–126; and a first internal bus 160 and second internal bus 170 for interconnecting the buffers 120–126. Each of buffers 120–126 function as posted data buffers, and suitably comprise multiple-port memory devices such as dual-port RAMs. For example, CPU buffer 120 has one port coupled to CPU bus 140, and has the other port coupled to the first internal bus 160. CPU buffer 120 stores CPU accesses to PCI bus 108 and main memory 106 so that execution of CPU 102 can continue concurrently with the accesses performed by CPU buffer 120.

CPU-to-PCI buffer 122 has one port coupled to the first internal bus 160, and has the other port coupled to the second internal bus 170. CPU-to-PCI buffer 122 stores CPU access to PCI bus 108 (which includes accesses to expansion bus 114 via PCI bus 108 and expansion bus bridge 112). This configuration allows CPU buffer 120 to post data destined for PCI bus 108 into CPU-to-PCI buffer 122, then CPU buffer 120 can arbitrate for control of memory bus 150 and continue interacting with memory buffer 124. In this manner, CPU-to-PCI buffer 122 can be writing data to PCI bus 108 concurrently with CPU writes to main memory by writing data to memory buffer 124 via first internal bus 160 after posting PCI data to CPU-to-PCI buffer 122.

Memory buffer 124 is placed on memory bus 150, with one port coupled via memory bus 150 to the output of memory bus arbiter 128 such that the device that wins arbitration for the memory bus accesses data in memory buffer 124. The other port of memory buffer 124 is coupled via memory bus 150 to main memory 106. Memory buffer 124 stores accesses to main memory 106 from CPU buffer 120, from REFRESH cycles, and from PCI-to-memory buffer 126 (depending on which has won arbitration for memory bus 150).

Memory bus arbiter 128 selectively grants control of memory bus 150 to one of the following: a REFRESH cycle, CPU buffer 120, or PCI-to-memory buffer 126. The criteria for granting control of memory bus 150 are discussed in more detail below. When memory bus arbiter 128 grants control of memory bus 150 to the requesting device, that device may then access main memory 106 through memory buffer 124. For example, when memory bus arbiter 128 grants control of memory bus 150 to CPU buffer 120, the accesses by CPU buffer 120 to memory buffer 124 may be performed concurrently with accesses by CPU-to-PCI buffer 122 to PCI bus 108. When memory bus arbiter 128 grants control of memory bus 150 to PCI-to-memory buffer 126, the accesses by PCI-to-memory buffer 126 may be performed concurrently with CPU accesses to CPU buffer 120 and accesses by CPU-to-PCI buffer 122 to PCI bus 108. Besides servicing CPU buffer 120 and PCI-to-memory buffer 126, memory bus arbiter 128 also arbitrates for control of memory bus 150 to refresh main memory 106, as shown by the REFRESH signal that is input to host bridge 104 at memory bus arbiter 128. REFRESH is a suitable signal generated by refresh circuitry external to host bridge 104 to maintain the contents of the DRAMS that form main memory 106.

PCI-to-memory buffer 126 has one port coupled to the second internal bus 170, and has the other port coupled to the memory bus arbiter 128. PCI-to-memory buffer 126 suitably contains data to be written to main memory 106 by a device that is in control of PCI bus 108, such as one of devices 110A–C or expansion bus bridge 112.

Control circuitry 130 controls the function of buffers 120–126 and memory bus arbiter 128, and suitably comprises one or more state machines that maximize concurrent operation of the buffers where possible. Control circuitry 130 governs when each buffer 120–126 may be loaded by operating on buffers 120–126 in accordance with basic rules that apply to each buffer to maximize concurrency while assuring data coherency. The four rules concerning the four buffers are listed below:

I. CPU buffer 120 may be loaded if any of the following three conditions are met:
1) memory bus arbiter 128 has awarded control of memory bus 150 to CPU buffer 120, and the target of the write cycle is main memory 106;
2) CPU-to-PCI buffer 122 is not full and the target of the write cycle is PCI bus 108; or
3) memory bus arbiter 128 has awarded control of memory bus 150 to PCI-to-memory buffer 126, which has requested a snoop that was dirty and CPU 102 (or other agent on CPU bus 140, such as a cache controller), is writing back the dirty cache line.

II. CPU-to-PCI buffer 122 may be loaded if it has space for more data.

III. Memory buffer 124 may be loaded if it has space for more data.

IV. PCI-to-memory buffer 126 may be loaded if memory bus arbiter 128 has allocated control of memory bus 150 to PCI bus 108.

By adhering to these four rules, control circuitry 130 allows posting of write cycles without flushing the other buffers, resulting in a greater degree of concurrency in the operation of CPU 102, PCI bus 108, and memory bus 150.

Deadlock conditions are avoided in system 100 by employing memory bus arbiter 128 to allocate memory bus 150 to either a REFRESH cycle, memory buffer 124, or PCI-to-memory buffer 126 according to the rules below:

I. REFRESH has highest priority but can be deferred and buffered if PCI-to-memory buffer 126 currently has control of memory bus 150;

II. CPU buffer 120 has the next highest priority unless the FAIRNESS FUNCTION (discussed below) has been activated;

III. PCI-to-memory buffer 126 has the lowest priority unless the FAIRNESS FUNCTION has been activated, which results in PCI-to-memory buffer 126 having the highest priority.

The FAIRNESS FUNCTION is activated when PCI-to-memory buffer 126 needs to access data in main memory 106 and memory bus arbiter 128 has allocated control of memory bus 150 to another device (e.g., REFRESH or CPU buffer 120). Once enabled, PCI-to-memory buffer 126 will win arbitration once the ongoing transaction is complete, resulting in memory bus arbiter 128 awarding control of memory bus 150 to PCI-to-memory buffer 126. The FAIRNESS FUNCTION is deactivated when eight consecutive idle cycles on PCI bus 108 occur.

Deadlock conditions on CPU bus 140 are also a concern, since a snoop cycle on CPU bus 140 may result in a deadlock if the snoop cycle is not guaranteed access to CPU bus 140. As a result, when PCI-to-memory buffer 126 requests a snoop cycle on CPU bus 140, the snoop logic must win arbitration for CPU bus 140. This will occur if the following rule is obeyed:

I. The snoop cycle can occur once CPU-to-PCI buffer 122 is not transferring data on PCI bus 108.

Given the rules above and the system as shown in FIG. 1, examples will now be described to illustrate the advantages of computer system 100 in accordance with the present invention. When CPU 102 needs to write data to PCI bus 108, the data is stored in (posted to) CPU buffer 120, leaving CPU 102 free to continue its operations. CPU buffer 120 then transfers the write data to CPU-to-PCI buffer 122. Control circuitry 130 will then arbitrate for host bridge 104 to gain control of PCI bus 108, and, once granted, CPU-to-PCI buffer 122 transfers the posted data to PCI bus 108.

When a device other than host bridge 104 (e.g., one of PCI devices 110A–C or expansion bus bridge 112) becomes master (i.e., has control) of PCI bus 108 and needs to access main memory, the data will be posted to PCI-to-memory buffer 126 only if PCI-to-memory buffer 126 first receives ownership of memory bus 150 from memory bus arbiter 128. If PCI-to-memory buffer 126 cannot gain ownership of memory bus 150, it signals a retry to the PCI master via the PCI protocol for target terminations. The PCI master will then continue to retry the transfer until the PCI-to-memory buffer 126 does receive ownership of memory bus 150, at which time the data will be transferred to PCI-to-memory buffer 126. Once PCI-to-memory buffer 126 obtains ownership of memory bus 150 and receives data from the master, it does not relinquish ownership of memory bus 150 until all the data received from the PCI master is transferred into main memory 106. This feature assures data coherency without flushing the other buffers.

One advantage of using the PCI-to-memory buffer 126 is that, since the memory bus transfers generally take longer than the PCI bus transfers, the PCI master can send the data to PCI-to-memory buffer 126 and free PCI bus 108 for other transfers before the transfer of the posted data to main memory 106 by PCI-to-memory buffer 126 and memory buffer 124 is complete. Thus, if data is sitting in CPU-to-PCI buffer 122, it can be transferred to PCI bus 108 while the PCI-to-memory buffer 126 is still transferring the buffered data from the previous PCI master write cycle.

One specific example of concurrency may be quantified to determine the improvement in system performance provided by the buffers in accordance with the present invention. Referring now to FIG. 2, the operation of the buffers may be understood by assuming that each returns a signal RDY to indicate when a transfer is complete. The cycles shown in FIG. 2 are for a CPU write to a PCI bus device (110A–C or 112) followed by a CPU read from main memory 106. CPU buffer 120 stores the CPU write to the PCI device, and returns CPU BUFFER RDY. CPU buffer 120 then writes this data into CPU-to-PCI buffer 122, which returns CPU-TO-PCI BUFFER RDY when the write is complete. CPU-to-PCI buffer 122 must then arbitrate for ownership of PCI bus 108 so it can transfer its data to the appropriate PCI device. When CPU-to-PCI buffer 122 has completed the write of its data to the target PCI device, the target returns PCI BUS RDY. Note, however, that the next cycle is a CPU read from main memory 106, and was commenced before the PCI BUS RDY was received, i.e., while the write is still operating on PCI bus 108. The write completes when PCI BUS RDY is asserted, and the read is then completed when PCI-TO-MEMORY BUFFER RDY is asserted. At this point CPU buffer 120 may issue the next cycle. Note, however, that in the example illustrated in the timing diagram of FIG. 2, the write to PCI bus 108 took five clocks to complete while the read also took five clocks. If performed sequentially, these two cycles would have required eleven clocks, ten for the cycles and one for an extra RDY/Start delay. When performed concurrently, however, as shown in FIG. 2, the two cycles take only eight cycles to complete.

Note that the foregoing discussions apply with equal force whether the PCI device is a device 110A–C or is expansion bus bridge 112. Since all accesses to expansion bus 114 must occur via expansion bus bridge 112 and PCI bus 108, the foregoing discussion regarding transfers to PCI bus 108 applies to transfers to expansion bus 114 as well, with an added step of accessing the data in one of devices 116A–C by expansion bus bridge 112.

While the invention has been particularly shown and described with reference to a preferred exemplary embodiment thereof, it will be understood by those skilled in the art that various changes in form and details may be made therein without departing from the spirit and scope of the invention. For example, while the buffers are shown in FIG. 1 within host bridge 104, they could be otherwise distributed in the system within the scope of the present invention. Or, this invention may be applied to I/O buses other than the PCI. In addition, it will be understood that, while various of the conductors or connections are shown in the drawing as single lines, they are not so shown in a limiting sense, and may comprise plural conductors or connections, as is understood in the art.

We claim:

1. In a computer system having a CPU, a data source, and a bus coupled to at least one bus device, buffers for providing concurrent system operations, comprising:

first buffer means coupled to the CPU for storing CPU accesses;

second buffer means coupled to the bus and to the first buffer means for storing accesses by the first buffer means to the bus;

third buffer means coupled to the first buffer means and to the data source for storing accesses by the first buffer means to the data source;

control circuitry means for controlling the function of the first, second and third buffer means, wherein the control circuitry means:

loads an access by the CPU into the first buffer when the first buffer has exclusive access to the data source, and the access by the CPU is to the data source;

loads the access by the CPU into the first buffer when the second buffer is both not full and has access to the local bus;

loads the access by the CPU into the first buffer when the third buffer has exclusive access to the data source, and the CPU access is to the data source;

loads an access to the first buffer into the second buffer if the second buffer is not full; and loads an access to the data source into the third buffer if the third buffer is not full.

2. The buffers of claim 1 wherein the control circuitry means provides concurrent operation of the second buffer means and the third buffer means when the first buffer means performs a write cycle to one of the second and third buffer means, followed by an access to the other of the second and third buffer means.

3. The buffers of claim 1 further comprising fourth buffer means coupled to the bus and to the third buffer means for storing accesses by the local bus to the data source.

4. The buffers of claim 1 wherein said data source comprises a memory device.

5. The buffers of claim 3 further comprising arbiter means coupled to the first buffer means, to the third buffer means, and to the fourth buffer means, for selectively granting access to the third buffer means to one of the first buffer means and the fourth buffer means.

6. The buffers of claim 5 wherein the arbiter means gives access to the third buffer means exclusively to the fourth buffer means until all transfers stored in the fourth buffer means are transferred through the third buffer means into the data source.

7. A computer system, comprising:

a CPU coupled to a CPU buffer;

a CPU buffer being further coupled through a second buffer to a data source, and through a CPU-to-bus buffer to a bus;

the CPU-to-bus buffer being connected to the CPU in parallel with the second buffer such that parallel concurrent operation of both the data source and the bus can occur, wherein:

an access by the CPU is loaded into the first buffer when the first buffer has exclusive access to the data source, and the access by the CPU is to the data source;

the access by the CPU loads into the first buffer when the second buffer is both not full and has access to the local bus;

the access by the CPU loads into the first buffer when the third buffer has exclusive access to the data source, and the CPU access is to the data source;

an access to the first buffer loads into the second buffer if the second buffer is not full; and an access to the data source loads into the third buffer if the third buffer is not full.

8. The computer system of claim 7 wherein said bus comprises a local bus.

9. The computer system of claim 8 wherein said local bus comprises a PCI bus, and wherein said data source comprises main memory.

10. A computer system, comprising:

a CPU;

a main memory;

a PCI device; and bridging means, having three buffers respectively coupled to the CPU, the main memory, and the PCI device, for coordinating both concurrent data reception and concurrent data exchange between the three buffers by operating when at least on of the three buffers is partially full, wherein the bridging means:

loads an access by the CPU into the first buffer when the first buffer has exclusive access to the main memory, and the access by the CPU is to the main memory;

loads the access by the CPU into the first buffer when the second buffer is both not full and has access to the local bus;

loads the access by the CPU into the first buffer when the third buffer has exclusive access to the main memory, and the CPU access is to the main memory;

loads an access to the first buffer into the second buffer if the second buffer is not full; and loads an access to the main memory into the third buffer if the third buffer is not full.

11. The computer system of claim 10, wherein the bridge means further comprises means for assuring both data coherency and prevention of deadlock.

* * * * *